United States Patent
Kim et al.

(10) Patent No.: US 10,100,885 B2
(45) Date of Patent: Oct. 16, 2018

(54) LAUNCH CONTROL METHOD FOR VEHICLE

(71) Applicant: HYUNDAI MOTOR COMPANY, Seoul (KR)

(72) Inventors: Jin Sung Kim, Hwaseong-si (KR); Ju Hyun Nam, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 487 days.

(21) Appl. No.: 15/052,443

(22) Filed: Feb. 24, 2016

(65) Prior Publication Data

US 2017/0097056 A1    Apr. 6, 2017

(30) Foreign Application Priority Data

Oct. 2, 2015   (KR) ........................ 10-2015-0139021

(51) Int. Cl.
| | | |
|---|---|---|
| *F16H 48/06* | (2006.01) | |
| *F16D 48/06* | (2006.01) | |
| *F16D 48/08* | (2006.01) | |

(52) U.S. Cl.
CPC ........... *F16D 48/064* (2013.01); *F16D 48/08* (2013.01); *F16D 2500/1045* (2013.01); *F16D 2500/1083* (2013.01); *F16D 2500/10412* (2013.01); *F16D 2500/1107* (2013.01); *F16D 2500/3065* (2013.01); *F16D 2500/3067* (2013.01); *F16D 2500/3068* (2013.01); *F16D 2500/30421* (2013.01); *F16D 2500/3144* (2013.01); *F16D 2500/3166* (2013.01);
(Continued)

(58) Field of Classification Search
CPC ........ F16D 48/08; F16D 48/06; F16D 48/064; F16D 48/066; F16D 2500/70668; F16D 2500/3065; F16D 2500/3144; F16D 2500/50287
See application file for complete search history.

(56) References Cited

U.S. PATENT DOCUMENTS 9,020,718 B2 *  4/2015  Katsumata ............ F16H 61/143
                                                    477/162
9,676,390 B2 *  6/2017  Fairgrieve ............. B60W 10/06
(Continued)

FOREIGN PATENT DOCUMENTS

JP        2003-262240 A     9/2003
JP        2014-066354 A     4/2014
(Continued)

*Primary Examiner* — Erin D Bishop
(74) *Attorney, Agent, or Firm* — Brinks Gilson & Lione

(57) ABSTRACT

A launch control method of a vehicle includes: a clutch hold step of maintaining a clutch torque until an engine torque becomes smaller than the clutch torque, when a driver releases an accelerator pedal during launch control; a time constant determination step in which a time constant for a rate of releasing the clutch torque is determined depending on a difference between the clutch torque and a target creep torque when the engine torque becomes smaller than the clutch torque; a filter processing step of processing the time constant and the target creep torque using a low-pass filter that has the time constant and the target creep torque as an input and has a nominal clutch torque as an output; and a clutch control step of controlling a clutch using the nominal clutch torque.

7 Claims, 8 Drawing Sheets

(52) U.S. Cl.
CPC .................. *F16D 2500/508* (2013.01); *F16D 2500/50239* (2013.01); *F16D 2500/50287* (2013.01); *F16D 2500/7041* (2013.01); *F16D 2500/7044* (2013.01); *F16D 2500/70408* (2013.01); *F16D 2500/70668* (2013.01)

(56) References Cited

U.S. PATENT DOCUMENTS

2005/0272558 A1   12/2005  Yoshida et al.
2015/0088394 A1    3/2015  Hawkins et al.

FOREIGN PATENT DOCUMENTS

| | | |
|---|---|---|
| JP | 2014-202331 A | 10/2014 |
| KR | 10-2011-0051059 | 5/2011 |
| KR | 10-2011-0107066 A | 9/2011 |
| KR | 10-2012-0136607 | 12/2012 |

\* cited by examiner

"PRIOR ART"

LAUNCH CONTROL METHOD FOR VEHICLE

CROSS REFERENCE TO RELATED APPLICATION

The present application claims priority to and the benefit of Korean Patent Application No. 10-2015-0139021, filed Oct. 2, 2015, which is incorporated herein by reference in its entirety.

FIELD

The present disclosure relates to a launch control method for a vehicle, and more particularly to a technique for controlling a dry clutch during launch of a vehicle with a transmission such as an automated manual transmission (AMT) or a dual clutch transmission (DCT) including the dry clutch.

BACKGROUND

The statements in this section merely provide background information related to the present disclosure and may not constitute prior art.

Although dry clutch type AMTs or DCTs are excellent in fuel efficiency due to having a lock-up clutch mechanism, they cannot provide hardware damping and lubricating effects because there is no fluid clutch such as a torque converter. Therefore, when a clutch is engaged or released at low speed, a shock may be induced despite a small torque difference.

For reference, the term simply expressed as "clutch" refers to a "dry clutch".

Launch control of a vehicle with such a dry clutch type AMT or DCT refers to starting the vehicle in such a way that after a target engine speed is set corresponding to an extent to which a driver presses an accelerator pedal, the clutch is gradually engaged while slipping the clutch such that the engine speed follows the target engine speed.

Furthermore, launch tip-out control refers to control for coping with the case where during the launch control a driver suddenly releases the accelerator pedal to stop or decelerate the vehicle.

The launch tip-out control is control for a transition section in which an engine and a transmission release power at the same time. In the case of the launch tip-out control, the accuracy of information about the engine torque is low, and there is uncertainty in clutch torque due to variation in characteristics of the clutch by slip occurring during launch. Therefore, it is difficult to perform appropriate control. If appropriate control cannot be achieved, a phenomenon such as an excessive increase or reduction in engine speed or an engine stall may be caused. Due to an abrupt change in torque, a shock may be applied to the vehicle.

SUMMARY

The present disclosure proposes a launch control method for vehicles which is capable of more appropriately conducting launch tip-out control of a vehicle with a dry clutch type AMT or DCT, thus preventing or inhibiting a phenomenon such as an excessive increase or reduction in engine speed or an engine stall, and preventing or inhibiting a shock from being applied to the vehicle, thereby enhancing the drivability of the vehicle.

According to one form, there is provided a launch control method for a vehicle, including: a clutch hold step of maintaining, by a controller, a clutch torque until an engine torque becomes smaller than the clutch torque, when a driver releases an accelerator pedal during launch control; a time constant determination step of determining, by the controller after the clutch hold step, a time constant for a rate of releasing the clutch torque depending on a difference between the clutch torque and a target creep torque at a point in time at which the engine torque becomes smaller than the clutch torque; a filter processing step of processing, by the controller, the time constant of the time constant determination operation and the target creep torque at the point in time at which the engine torque becomes smaller than the clutch torque, using a low-pass filter that receives the time constant and the target creep torque as an input and provides a nominal clutch torque as an output; and a clutch control step of controlling, by the controller, a clutch using the nominal clutch torque.

The time constant in the time constant determination operation may be determined from a time constant map depending on a difference between the target creep torque and the clutch torque, wherein the time constant map may be configured such that as the difference between the target creep torque and the clutch torque increases, the time constant is increased so that a rate at which the clutch torque is released is reduced to prevent or inhibit a shock from being applied to the vehicle, and when the difference between the target creep torque and the clutch torque reduces, the time constant is reduced so that the rate at which the clutch torque is released is increased to prevent or inhibit a delay in releasing the clutch and enable rapid control.

The launch control method may further include: an engine state determination step of determining, by the controller, whether an engine speed is smaller than a target engine idle speed or an engine speed variation is greater than a target engine speed variation, after the nominal clutch torque is calculated in the filter processing step and before the clutch control step; and a final value calculation step of subtracting a feedback controlled variable depending on conditions of the engine from the nominal clutch torque and calculating a final clutch torque, when the engine speed is less than the target engine idle speed or the engine speed variation is greater than the target engine speed variation as a result of performing the engine state determination step.

The feedback controlled variable depending on conditions of the engine in the final value calculation step may be determined depending both on a difference between the engine idle speed and the engine speed and on a difference between the target engine speed variation and the engine speed variation.

The feedback controlled variable depending on conditions of the engine in the final value calculation step may be obtained by adding a result of multiplying a difference between the engine idle speed and the engine speed by a gain to a result of multiplying a difference between the target engine speed variation and the engine speed variation by again.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
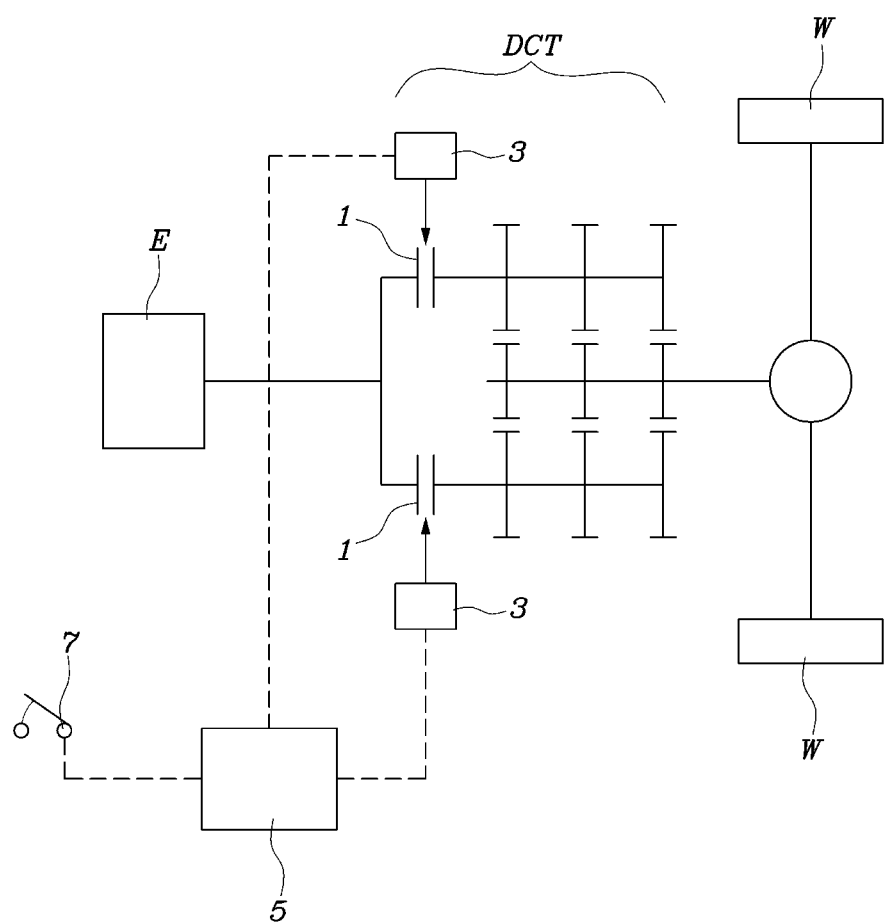
FIG. 1 is a view illustrating the configuration of a vehicle with a DCT to which the present disclosure can be applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a vehicle according to an embodiment of the present disclosure is configured such that the power of an engine E is provided to drive wheels W via a dual clutch transmission (DCT). Two clutches 1 of the DCT are controlled by respective clutch actuators 3. The clutch actuators 3 are controlled by a controller 5. The controller 5 receives a signal from an accelerator position sensor (APS) 7 to determine the extent to which an accelerator pedal is depressed.

In addition, the controller may receive information about engine torque, engine speed, etc.

Figure 2:
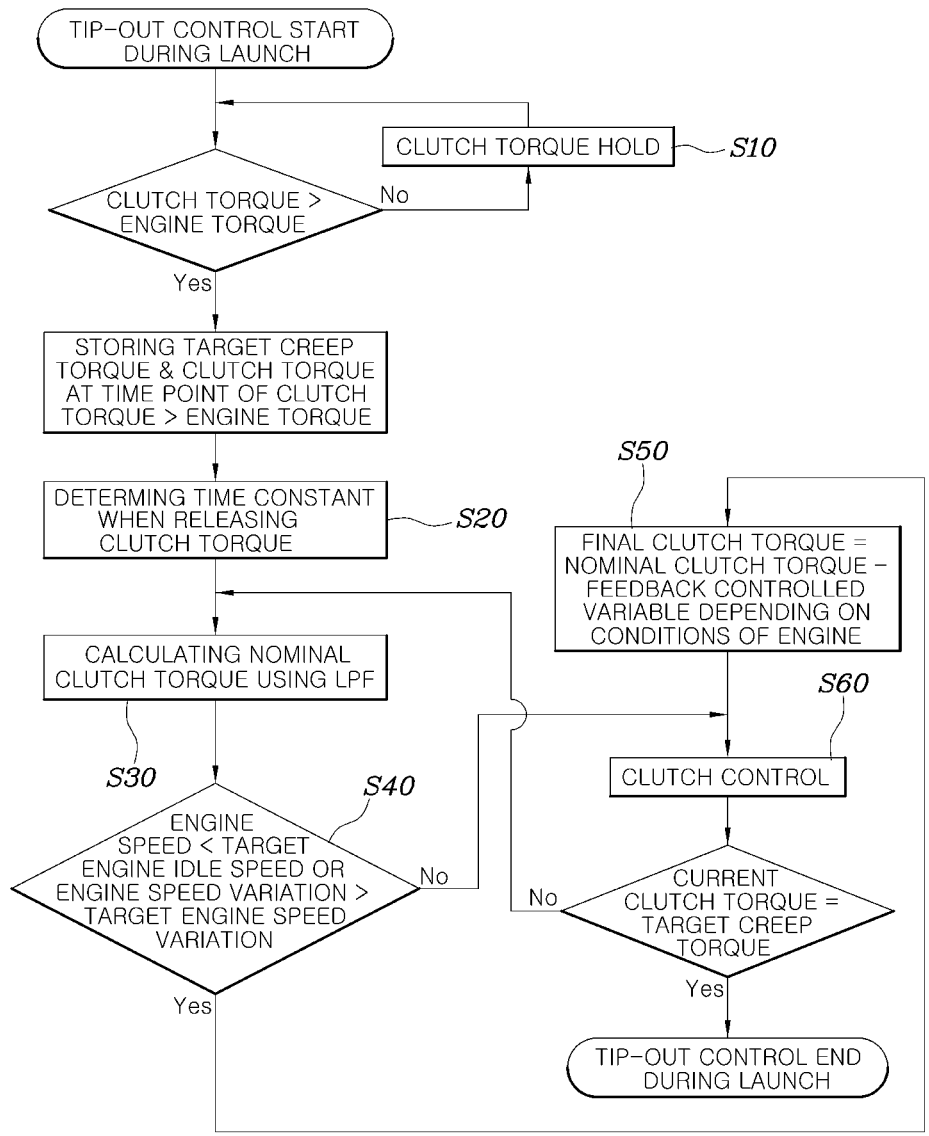
FIG. 2 is a flowchart illustrating an embodiment of a launch control method for a vehicle according to the present disclosure.

Referring to FIG. 2, a launch control method for a vehicle according to an embodiment of the present disclosure includes: a clutch torque hold step S10 of maintaining, by a controller, clutch torque until engine torque becomes smaller than the clutch torque, when a driver releases an accelerator pedal during launch control; a time constant determination step S20 of determining, by the controller after the clutch torque hold step, a time constant for a rate of releasing the clutch torque depending on a difference between the clutch torque and a target creep torque at a time when the engine torque becomes smaller than the clutch torque; a filter processing step S30 of processing, by the controller, the time constant of the time constant determination step S20 and the target creep torque at a time when the engine torque becomes smaller than the clutch torque, using a low-pass filter which has the time constant and the target creep torque as an input and has a nominal clutch torque as an output; and a clutch control step S60 of controlling, by the controller, a clutch using the nominal clutch torque.

In a tip-out condition in which the driver releases the accelerator pedal during the launch control, the vehicle is controlled such that the clutch torque is maintained until the engine torque becomes smaller than the clutch torque, and then the clutch torque is gradually reduced depending on a difference between the target creep torque and the clutch torque at a time when the engine torque begins to be smaller than the clutch torque. The clutch torque that is gradually reduced is determined using the nominal clutch torque determined by the time constant determination step S20 and the filter processing step S30.

The time constant of the time constant determination step S20 is determined from a time constant map depending on a difference between the target creep torque and the clutch torque. The time constant map is configured such that as a difference between the target creep torque and the clutch torque increases, the time constant is increased so that the clutch torque can be relatively slowly released to prevent or inhibit shock from being applied to the vehicle, and as a difference between the target creep torque and the clutch torque reduces, the time constant is reduced so that the clutch torque can be relatively rapidly released to prevent or inhibit a delay in releasing the clutch and make rapid control possible.

As such, because the time that takes to release the clutch torque to the target creep torque can be controlled by setting of the time constant map, in one form, the time constant map may be set to an appropriate configuration based on a plurality of tests for a desired kind of vehicle.

Figure 3:
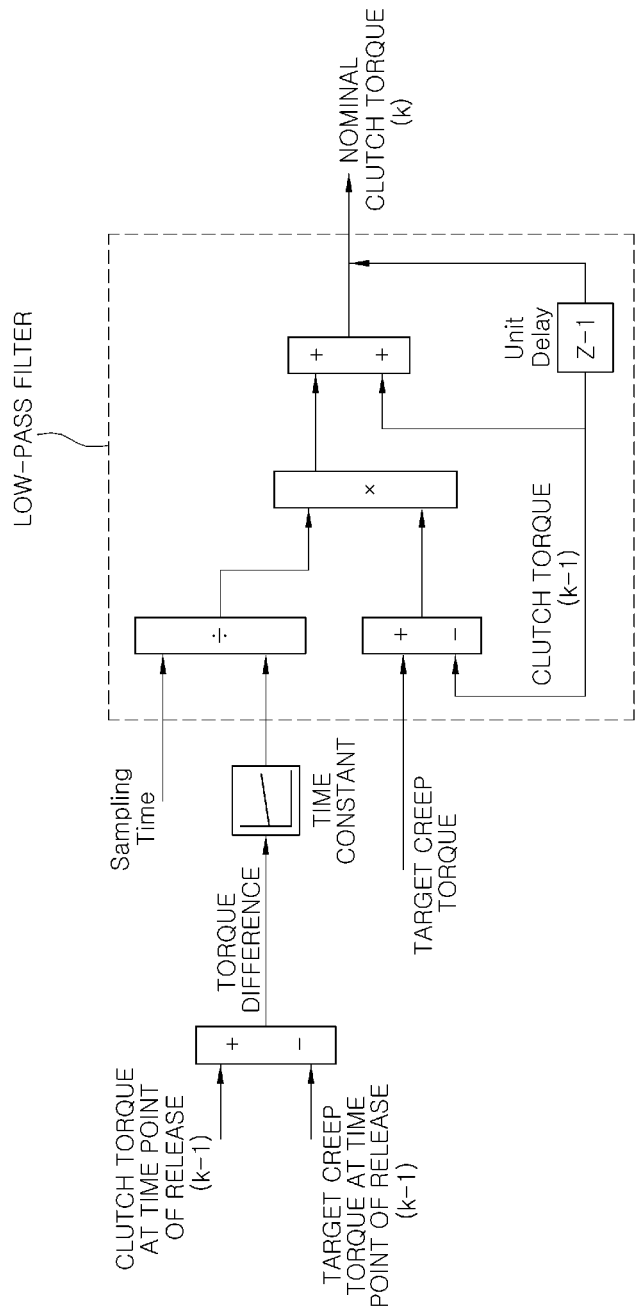
FIG. 3 is a block diagram illustrating an example of calculating a nominal clutch torque through a low-pass filter according to the present disclosure.

FIG. 3 is a block diagram illustrating an example of calculating the nominal clutch torque through the low-pass filter, as described above. The time constant is determined by a difference between the clutch torque and the target creep torque. The low-pass filter is configured as having the time constant and the target creep torque as an input. The low-pass filter is to calculate a controlled variable to be used to control the clutch for gradually reducing, to the target creep torque, the clutch torque at a point in time at which the clutch torque begins to be released after being maintained for a predetermined time for which the engine torque becomes smaller than the clutch torque. The controlled variable is the nominal clutch torque. The controller conducts the clutch control step S60 of controlling the clutch actuators using the nominal clutch torque as the controlled variable, thus controlling the clutch.

Here, the clutch torque at the point of time of release and the target creep torque at the point of time of release respectively refer to a clutch torque and a target creep torque at a time when the engine torque becomes smaller than the clutch torque. Reference character "k" denotes a sampling step, and "k−1" denotes a value of a preceding step with respect to a current step.

Figure 5:
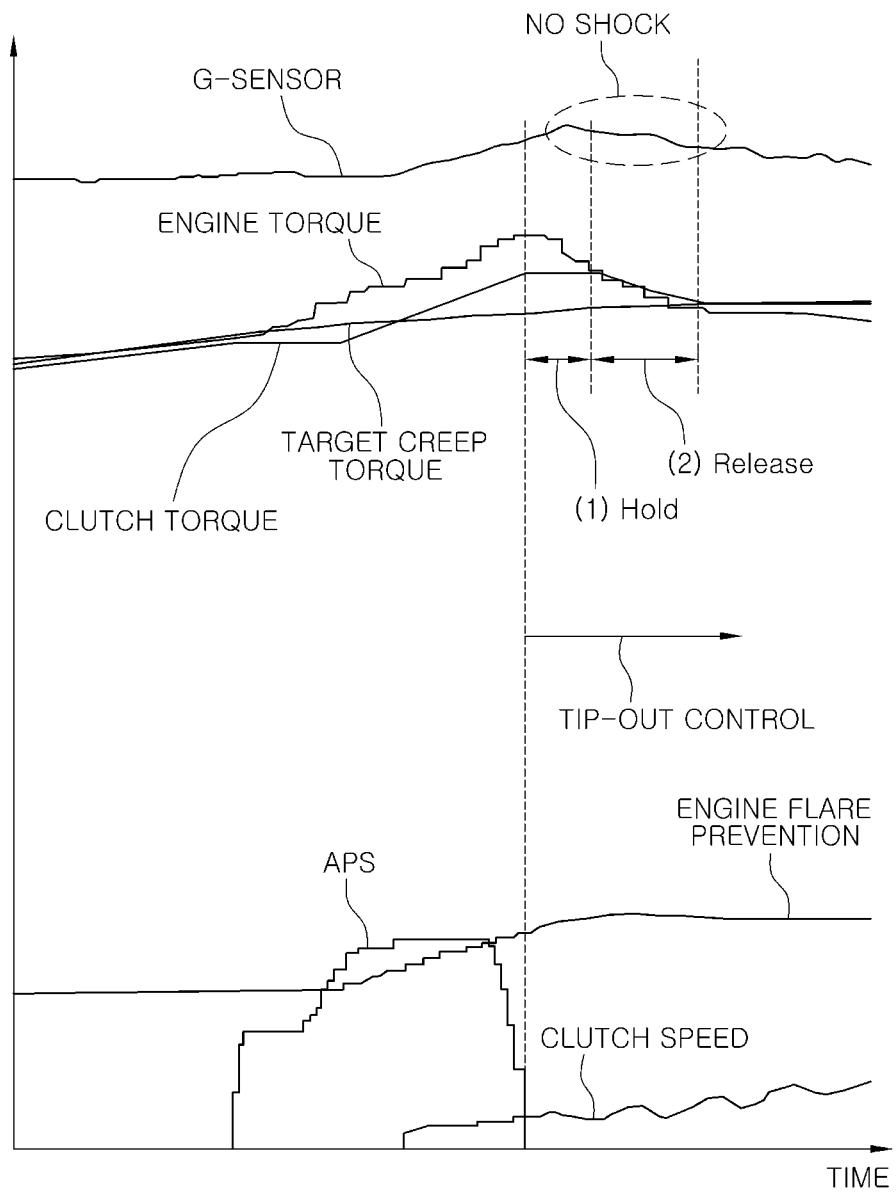
FIG. 5 is a graph showing the result of a test in accordance with the control method of the present disclosure.

FIG. 5 is a graph showing the result of a test of controlling the clutch according to the above-described control method. In a hold section, the clutch torque is maintained until the engine torque becomes smaller than the clutch torque from a time point at which an APS signal drops as the driver releases the accelerator pedal. In a release section, the clutch torque is gradually released in accordance with the nominal clutch torque obtained at the filter processing step. Here, during the hold of the clutch torque, the engine flare which refers to an excessive increase in engine speed can be prevented or inhibited. Furthermore, it can be understood from the graph of a G-sensor that there is no shock applied to the vehicle.

Meanwhile, the launch control method may further include an engine state determination step S40 of determining, by the controller, whether the engine speed is smaller than a target engine idle speed or an engine speed variation is greater than a target engine speed variation, after the nominal clutch torque is calculated at the filter processing step S30 and before the clutch control step S60.

As the result of performing the engine state determination step S40, if the engine speed is less than the target engine idle speed or the engine speed variation is greater than the target engine speed variation, the launch control method further includes a final value calculation step S50 at which a final clutch torque is calculated by subtracting a feedback controlled variable depending on conditions of the engine from the nominal clutch torque.

If the final value calculation step S50 is performed as the result of performing the engine state determination step S40, the clutch is controlled, at the clutch control step S60, using the final clutch torque determined at the final value calculation step S50. If there is no need for the final value calculation step S50 to be conducted, the clutch is controlled, at the clutch control step S60, using the nominal clutch torque obtained at the filter processing step S30.

The feedback controlled variable depending on conditions of the engine at the final value calculation step S50 may be determined depending both on a difference between the engine idle speed and the engine speed, and on a difference between the target engine speed variation and the engine speed variation.

Figure 4:
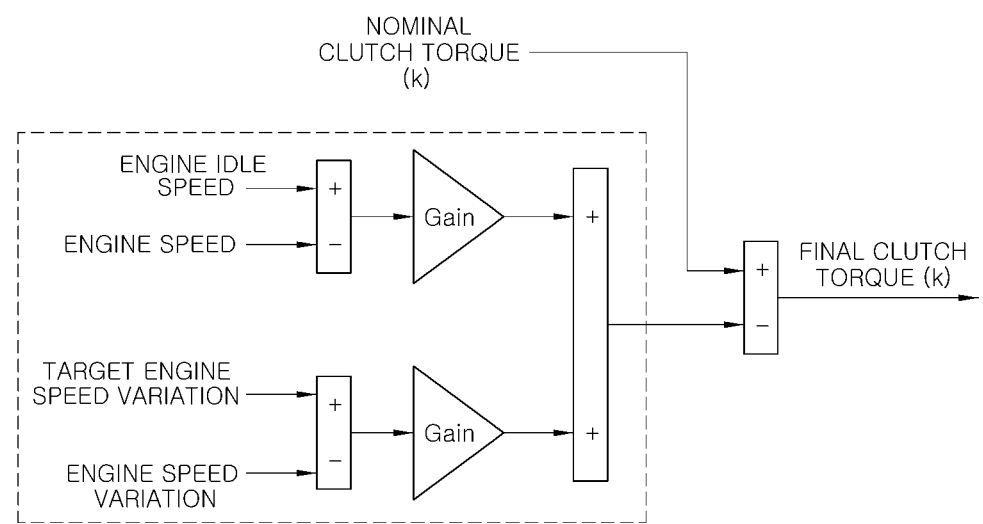
FIG. 4 is a block diagram illustrating an example of calculating a final clutch torque by subtracting a feedback controlled variable depending on conditions of an engine from a nominal clutch torque according to the present disclosure.

Particularly, as shown in FIG. 4, the feedback controlled variable depending on conditions of the engine at the final value calculation step S50 is obtained by adding a value that is obtained through multiplying a difference between the engine idle speed and the engine speed by a gain to a value that is calculated by multiplying a difference between the target engine speed variation and the engine speed variation by a gain.

Figure 6:
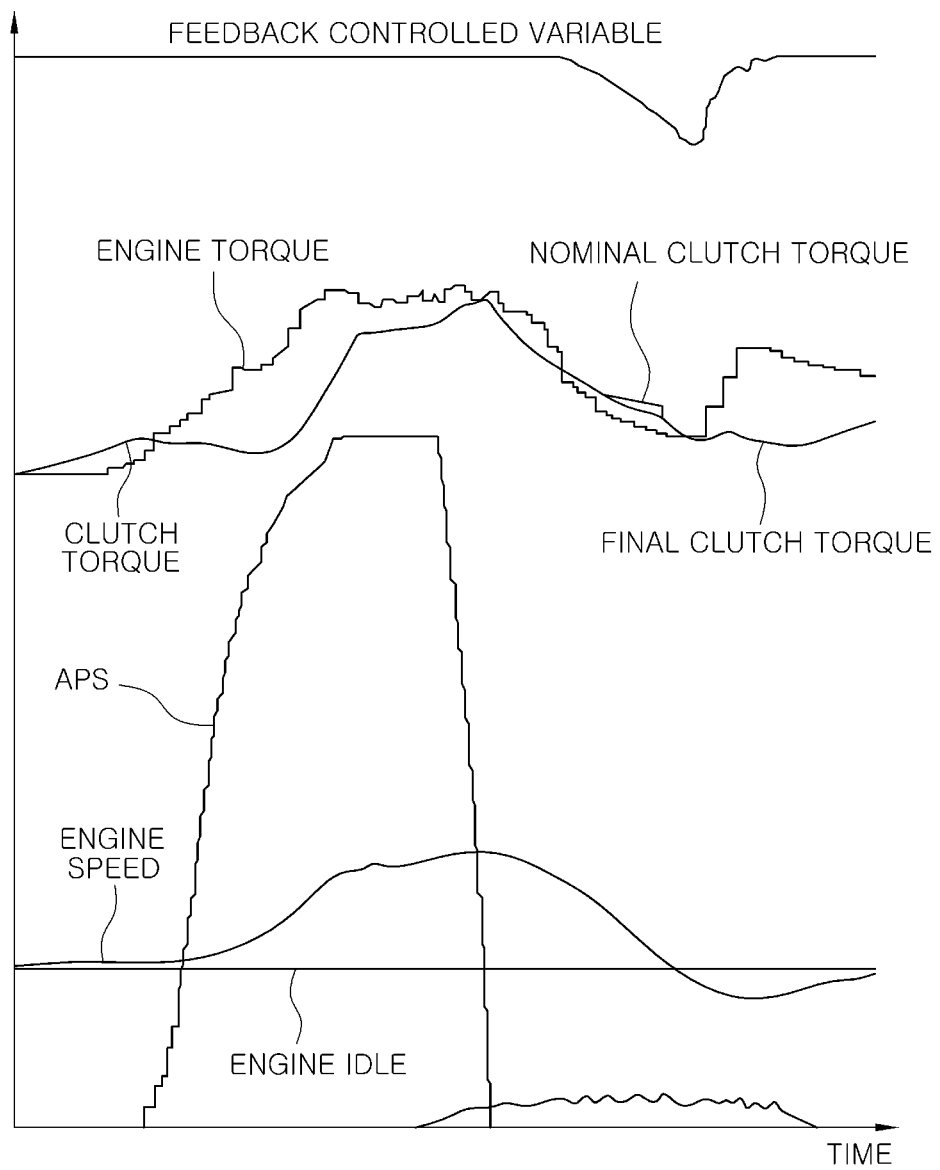
FIG. 6 is a graph showing the result of the test in accordance with the control method of the present disclosure to illustrate the case of subtracting the feedback controlled variable depending on conditions of the engine.

FIG. 6 illustrates the situation where a feedback controlled variable is counted. In detail, when the engine speed variation is greater than the target engine speed variation and thus an engine stall or an excessive reduction in engine speed may be caused, a final clutch torque is produced by subtracting a feedback controlled variable, which depends on the engine speed and the engine speed variation, from the nominal clutch torque. This final clutch torque is used to control the clutch, thus inhibiting unstable conditions such as an excessive reduction in engine speed or an engine stall from being induced. As shown in the drawing, a reduction in engine speed is mitigated when the final clutch torque is smaller than the nominal clutch torque.

Of course, the steps from the filter processing step 30 to the clutch control step S60 are repeatedly conducted until the final clutch torque becomes equal to the target creep torque.

Figure 7:
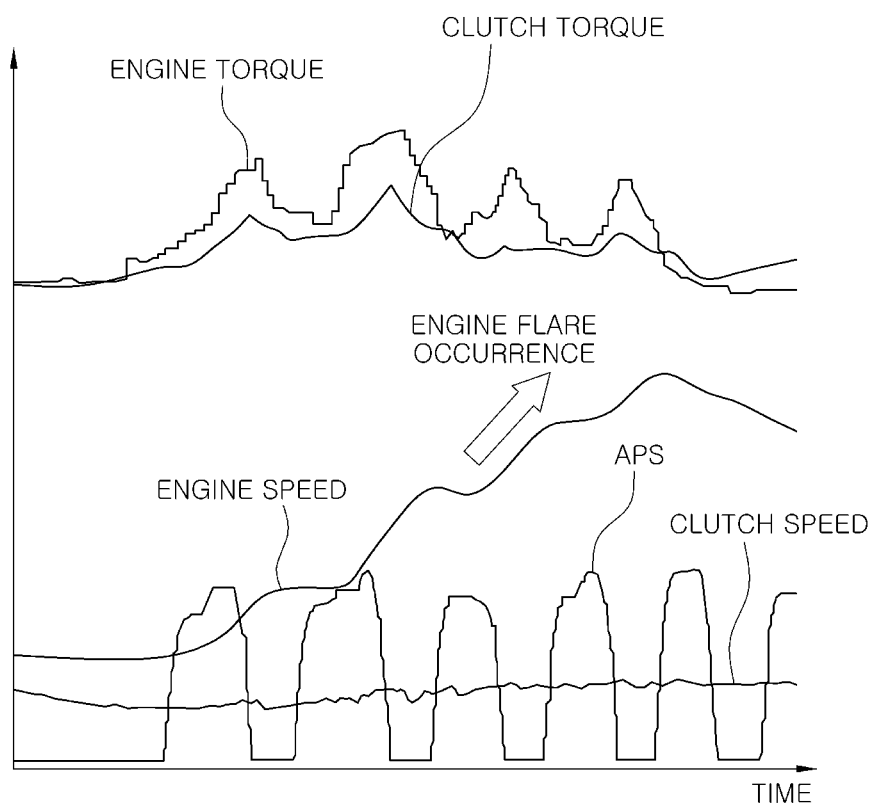
FIG. 7 is a graph illustrating the case where engine flare is caused by repeatedly stepping on and releasing an accelerator pedal during a vehicle launch according to a conventional technique.

FIG. 7 is a graph illustrating the case where engine flare is caused by repeatedly stepping on and releasing an accelerator pedal during a vehicle launch according to a conventional technique. In this case, every time the accelerator pedal is released, the clutch torque is reduced along with the engine torque rather than being maintained. Consequently, as an engine load is reduced, the engine speed is gradually increased, thus causing engine flare.

Figure 8:
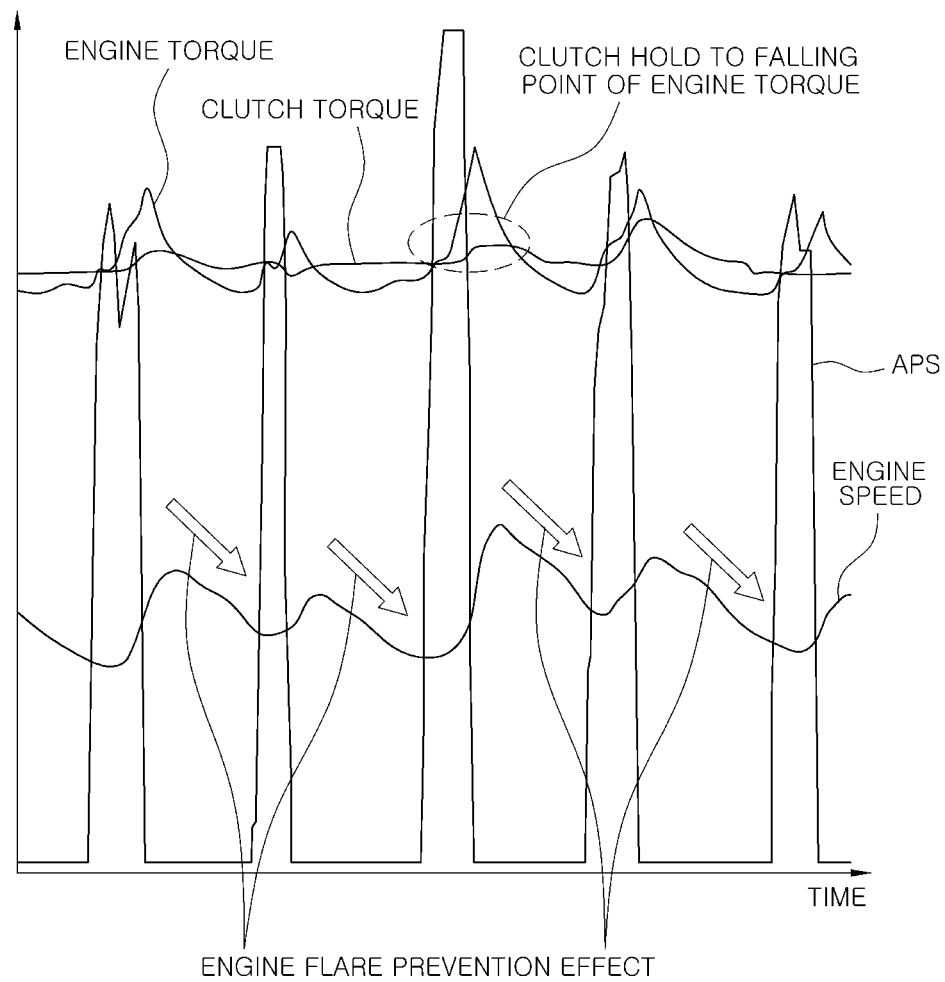
FIG. 8 is a graph illustrating the effect of inhibiting engine flare in an embodiment using the control method of the present disclosure, compared to the case of FIG. 7.

Unlike this, FIG. 8 shows that even if the accelerator pedal is repeatedly stepped on and released during a vehicle launch, the clutch torque hold step is conducted when the accelerator pedal is released, so that excessive engine load reduction can be inhibited. Therefore, an increase in the RPM of the engine is restricted, whereby engine flare can be inhibited.

As described above, a launch control method for vehicles according to the present disclosure is capable of more appropriately conducting launch tip-out control of a vehicle with a dry clutch type AMT or DCT, thus inhibiting a phenomenon such as an excessive increase or reduction in engine speed or an engine stall, and inhibiting a shock from being applied to the vehicle, thereby enhancing the drivability of the vehicle.

Although the exemplary embodiment of the present disclosure has been described for illustrative purposes, those skilled in the art will appreciate that various modifications, additions and substitutions are possible, without departing from the scope and spirit of the present disclosure.

What is claimed is:

1. A launch control method for a vehicle, comprising:
a clutch hold step of maintaining, by a controller, a clutch torque until an engine torque becomes smaller than the clutch torque, when a driver releases an accelerator pedal during launch control;
a time constant determination step of determining, by the controller, a time constant for a rate of releasing the clutch torque depending on a difference between the clutch torque and a target creep torque at a time when the engine torque becomes smaller than the clutch torque;
a filter processing step of processing, by the controller, the time constant of the time constant determination step and the target creep torque at the time when the engine torque becomes smaller than the clutch torque, using a low-pass filter configured to receive the time constant and the target creep torque as an input and configured to output a nominal clutch torque; and
a clutch control step of controlling, by the controller, a clutch using the nominal clutch torque.

2. The launch control method according to claim 1, wherein the time constant is determined from a time constant map depending on the difference between the target creep torque and the clutch torque,
wherein the time constant map is configured such that when the difference between the target creep torque and the clutch torque increases, the time constant is increased so that a rate at which the clutch torque is released is reduced to inhibit a shock from being applied to the vehicle, and when the difference between the target creep torque and the clutch torque reduces, the time constant is reduced so that the rate at which the clutch torque is released is increased to inhibit a delay in releasing the clutch and enable rapid control.

3. The launch control method according to claim 1, further comprising:
an engine state determination step of determining, by the controller, whether an engine speed is smaller than a target engine idle speed or an engine speed variation is greater than a target engine speed variation, after the nominal clutch torque is calculated in the filter processing step and before the clutch control step; and
a final value calculation step of subtracting a feedback controlled variable from the nominal clutch torque, the feedback controlled variable depending on conditions of the engine, and the final value calculation step calculating a final clutch torque, when the engine speed is less than the target engine idle speed or the engine speed variation is greater than the target engine speed variation as a result of performing the engine state determination step.

4. The launch control method according to claim 3, wherein the feedback controlled variable in the final value calculation step is determined depending both on a difference between the engine idle speed and the engine speed and on a difference between the target engine speed variation and the engine speed variation.

5. The launch control method according to claim 3, wherein the feedback controlled variable in the final value calculation step is obtained by adding a result of multiplying a difference between the engine idle speed and the engine speed by a gain to a result of multiplying a difference between the target engine speed variation and the engine speed variation by a gain.

6. The launch control method according to claim 1, wherein the filter processing step and the clutch control step are repeatedly conducted until a final clutch torque becomes equal to a target creep torque.

7. The launch control method according to claim 1, wherein the controller controls the clutch through a clutch actuator.

* * * * *